(12) United States Patent
Rowe

(10) Patent No.: US 7,006,102 B2
(45) Date of Patent: Feb. 28, 2006

(54) METHOD AND APPARATUS FOR GENERATING MODELS OF INDIVIDUALS

(75) Inventor: Simon Michael Rowe, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/424,724

(22) Filed: Apr. 29, 2003

(65) Prior Publication Data

US 2003/0201996 A1    Oct. 30, 2003

(30) Foreign Application Priority Data

Apr. 30, 2002    (GB)    ................................ 0209875

(51) Int. Cl.
*G09G 5/00*    (2006.01)
(52) U.S. Cl. ..................... 345/582; 351/204; 351/208
(58) Field of Classification Search ............... 345/418, 345/581–583; 382/117–118; 351/208, 200, 351/204; 348/78
See application file for complete search history.

(56) References Cited

U.S. PATENT DOCUMENTS

| | | | | |
|---|---|---|---|---|
| 6,614,919 | B1 * | 9/2003 | Suzaki et al. ............... | 382/117 |
| 6,664,956 | B1 * | 12/2003 | Erdem ......................... | 345/419 |
| 2001/0026351 | A1 * | 10/2001 | Gao et al. ................... | 351/227 |
| 2003/0021448 | A1 * | 1/2003 | Chen et al. .................. | 382/117 |
| 2003/0099409 | A1 | 5/2003 | Rowe .......................... | 382/285 |

FOREIGN PATENT DOCUMENTS

| | | |
|---|---|---|
| EP | 1 158 786 | 11/2001 |
| JP | 2001-175869 | 6/2001 |
| WO | 02/030171 | 4/2002 |

OTHER PUBLICATIONS

"Active Appearance Models," Cootes, T.F., Edwards, G.J. and Taylor, C.J.; Proc, European Conference of Computer Vision 1998, vol. 1.2, pp. 484-498 (1998).
U.S. Appl. No. 10/424,919 filed Apr. 29, 2003.
Great Britain Search Report, dated Oct. 1, 2003, in Application No. GB 0209875.4.

* cited by examiner

*Primary Examiner*—Matthew C. Bella
*Assistant Examiner*—Wesner Sajous
(74) *Attorney, Agent, or Firm*—Fitzpatrick, Cella, Harper & Scinto

(57) ABSTRACT

A communications system is described in which a plurality of mobile phones are provided, each including means for generating a user interface for enabling users to identify points in images as feature points. All of the phones are then operable to utilise points identified by users to generate 3D models of individuals in the images. The 3D models are generated by associating stored average depth data for points corresponding to the co-ordinates of the feature points and further points whose position is identified relative to the co-ordinates of the feature points. The 3D models are then used to generate images which are displayed on the mobile phones.

12 Claims, 6 Drawing Sheets

METHOD AND APPARATUS FOR GENERATING MODELS OF INDIVIDUALS

BACKGROUND OF THE INVENTION

1. Field of the Invention

The present application relates to methods and apparatus for generating models of individuals. In particular, embodiments of the present application relates to methods and apparatus for modelling individuals for display on mobile phones.

2. Description of the Related Art

There are many applications for computer systems that are able to generate recognisable images of individuals. These applications range from systems for displaying the face of a caller on a telephone through to computer graphics generated within computer games. One known method of modelling human faces is using principle component analysis, an example of which is disclosed in 'Active Appearance Models' Cooks et. al., Proc. European Conference of Computer Vision 1998, Vol 1.2, pp. 484–498, Springer, 1998.

SUMMARY OF THE INVENTION

In order to generate a model of the way in which faces vary, a large data set of different faces is first obtained. Feature points on the faces are then identified so that an average face can be determined. The manner in which each individual face used to generate the model varies from this average face can then be calculated and the results subjected to principle component analysis to determine the most significant ways in which faces within the data set vary.

By generating a model of an individual face using a limited number of the most significant variations, a reasonable approximation of a specific individual face then can be generated.

When displaying a 3D face model, it is desirable to be able to animate the eyes of such models. However, where models of faces vary in size, it is difficult to generate an animatable model of a 3 dimensional eye ball which is correctly sized to fit into a 3 dimensional face model such as may be generated utilising principle component analysis.

BRIEF DESCRIPTION OF THE DRAWINGS

Further aspects of the present invention will become apparent with reference to the accompanying drawings in which.

DETAILED DESCRIPTION OF THE INVENTION

First Embodiment

Figure 1:
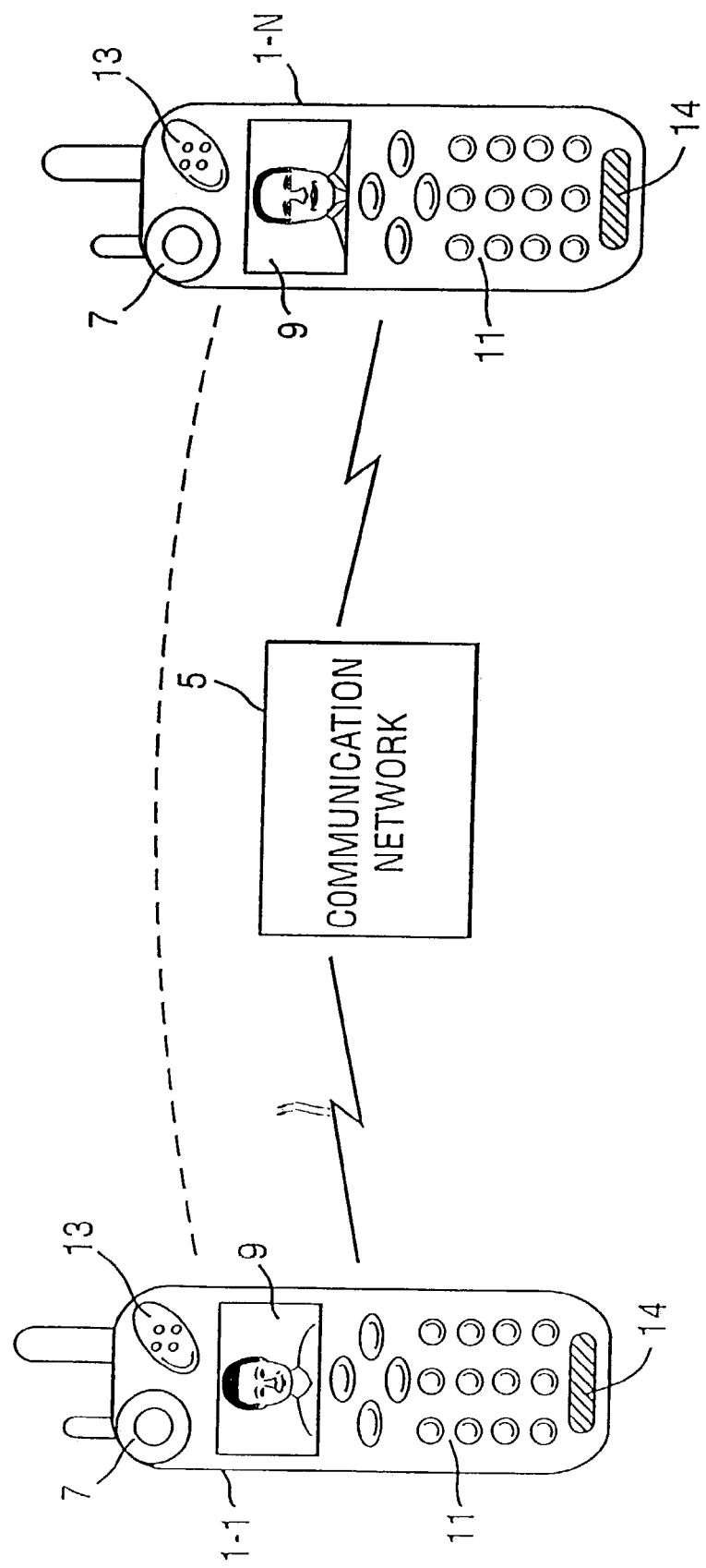
FIG. 1 is a schematic block diagram of a communications network including a pair of mobile phones in accordance with a first embodiment of the present invention.

FIG. 1 is a schematic block diagram of a communications network system. The communications system comprises a plurality of mobile phones 1-1–1-N that are connected to each other via a communications network 5. In accordance with this embodiment of the present invention, each of the mobile phones 1-1; 1-N is adapted to enable images generated from a 3D model of a caller to be displayed and comprises a camera 7 for taking pictures of the user of the phone 1-1; 1-N; a screen 9 for displaying images of the face of an individual calling the mobile phone 1-1; 1-N generated from a 3D model of the caller, a keyboard 11, a loudspeaker 13 and a microphone 14.

As will be described in detail later, the mobile phones 1-1–1-N in accordance with this embodiment of the present invention are each adapted to generate animatable three dimensional models of users from images taken with the cameras of the phones 1-1–1-N. The generated models are then transmitted via the communications network 5 when a telephone call is made. Upon receipt of a model, the mobile phones 1-1–1-N utilises the received model co-ordinates to generate an animated three dimensional representation of the individual making the call in which the eyes of the caller are made to move.

The structure of mobile phones 1-1–1-N in accordance with this embodiment of the present invention will now be described in greater detail with reference to FIG. 2.

Figure 2:
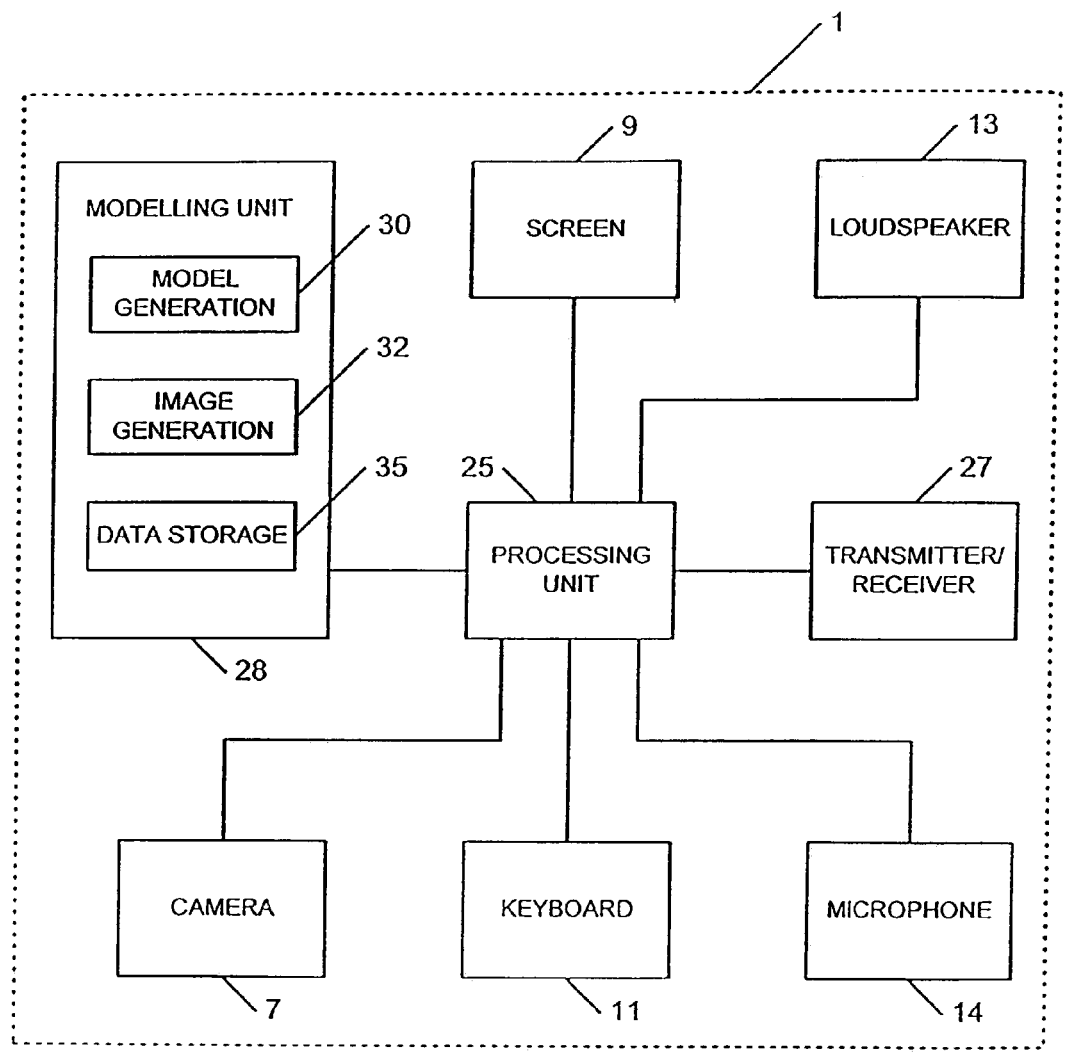
FIG. 2 is a schematic block diagram of a mobile phone of FIG. 1.

FIG. 2 is a schematic block diagram of a mobile phone 1 for use in accordance with this embodiment of the present invention.

In this embodiment, each of the mobile phones 1-1–1-N comprises a processing unit 25 which is connected to the keyboard 11, the camera 7, the screen 9, the loudspeaker 13 and microphone 14 of the phone 1. In addition the processing unit 25 is also connected to a transmitter/receiver 27 and a modelling unit 28.

In this embodiment, the modelling unit 28 has stored within it a model generation module 30 for determining Eigen values for principle component analysis models together with eye data for animating the models eyes; an image generation module 32 for processing received Eigen values and eye data received from other phones 1, to generate a three dimensional animated image of a caller on the screen 9; and a data storage section 35 for storing images and calculated Eigen values and eye data.

Figure 3:
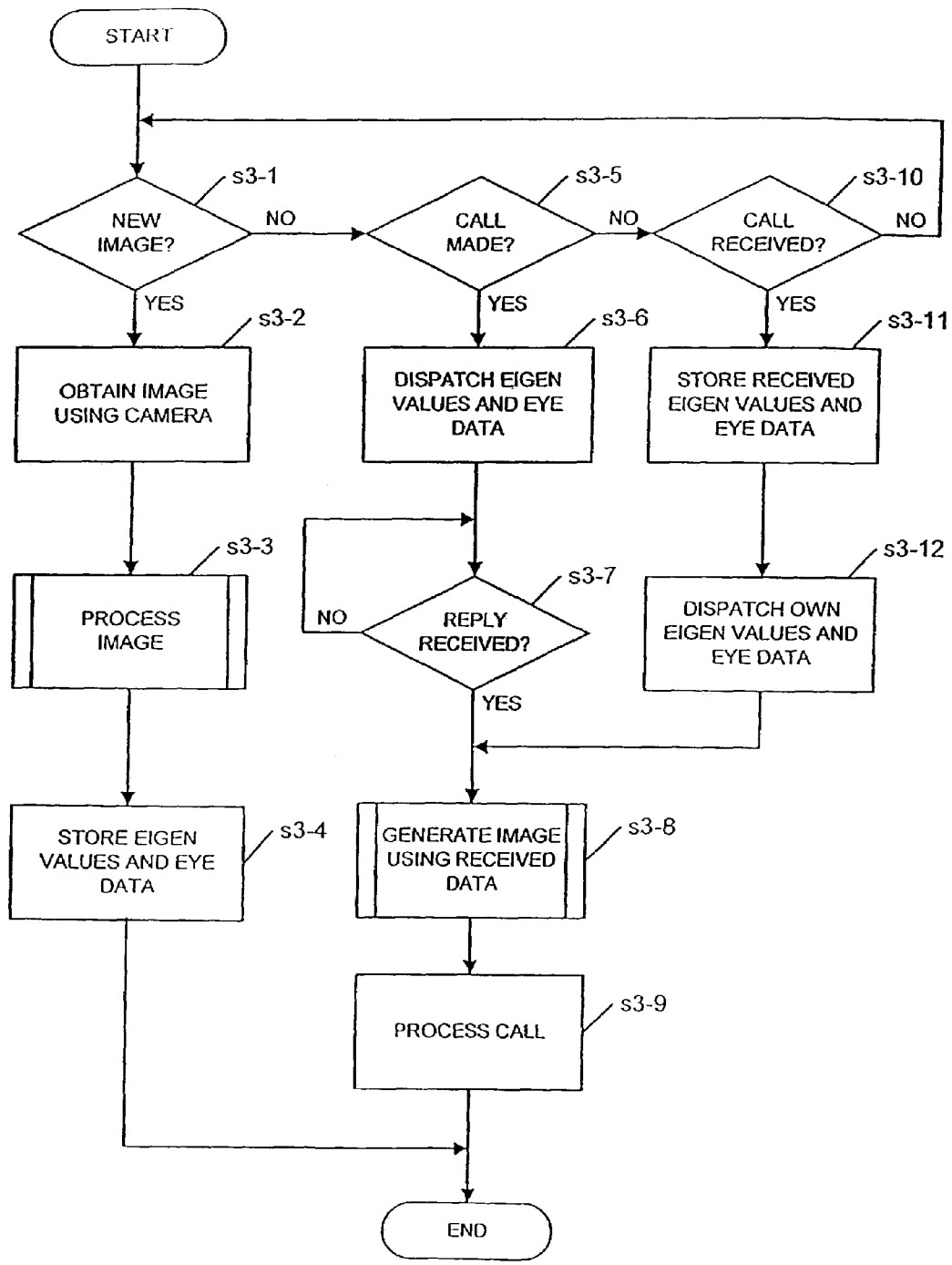
FIG. 3 is a flow diagram of an overview of the processing of data by the mobile phone of FIG. 2.

The processing of data by the processing unit 25 and modelling unit 28 of a mobile phone 1-1; 1-N in accordance with this embodiment of the present invention will now be described in detail with reference to FIG. 3.

The processing unit 25 initially (s3-1) determines whether any data has been input via the keyboard 11 indicating that the user of the phone 1 wishes to generate a new face model for storage within the memory 28 of the phone 1.

If this is the case, the processing unit 25 then (s3-2) causes a prompt to appear on the screen 9 of the phone 1 requesting the user to take a photograph of themselves using the camera 7 of the phone 1.

Figure 5:
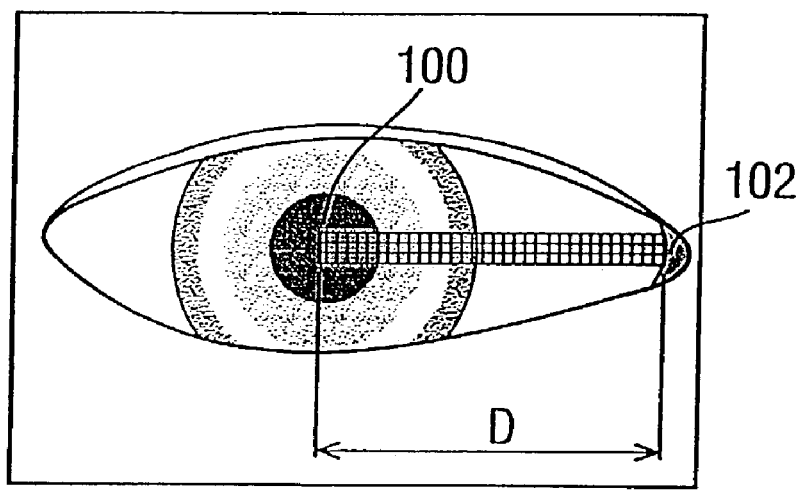
FIG. 5 is an exemplary image of an eye for explaining the generation of eye data.
Figure 6:
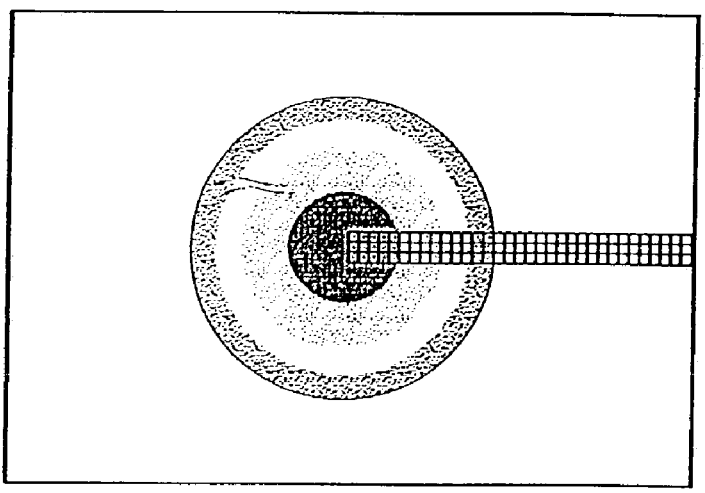
FIG. 6 is an exemplary illustration of eye data generated from the image of FIG. 5.

When an image obtained using the camera 7 the image is processed by the model generation module 30 of the modelling unit 28 to determine a set of Eigen values and eye data for generating an animatable model of an individual (s3-3) as will now be described in detail with reference to FIGS. 4, 5, and 6.

Figure 4:
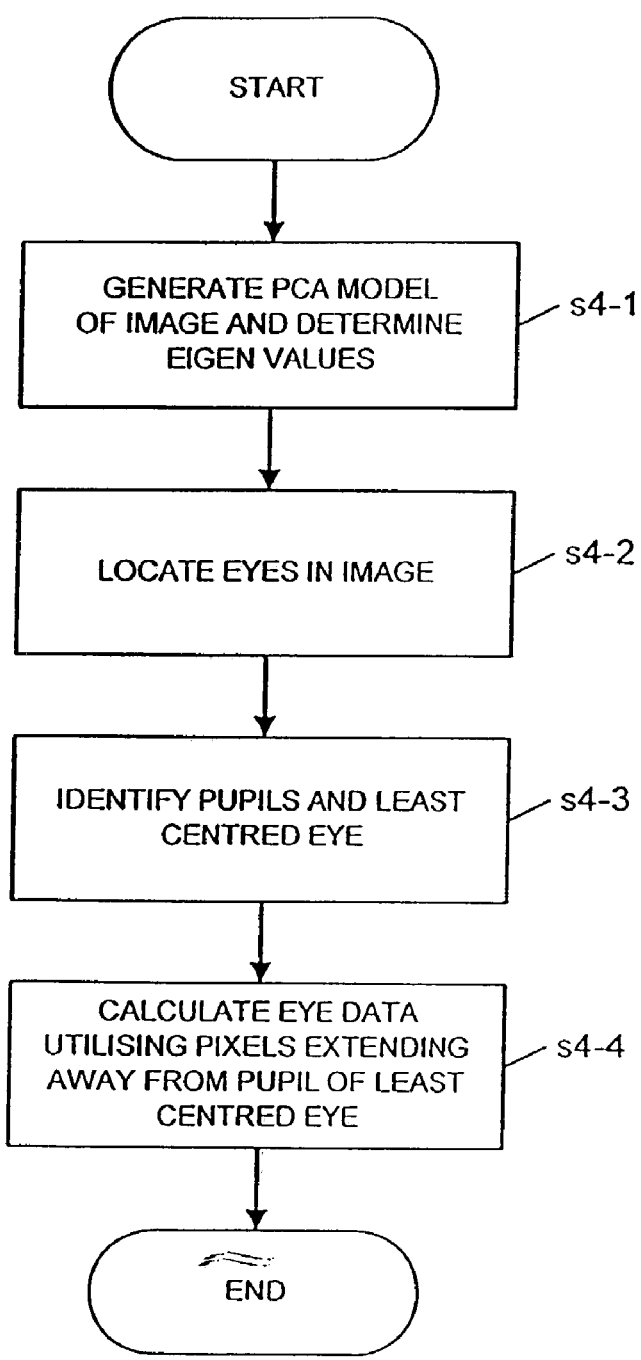
FIG. 4 is a flow diagram of the processing of data by a mobile phone of FIG. 2 to generate a set of Eigen values and eye data.

FIG. 4 is a flow diagram of the processing of the model generation module 30 for determining Eigen values for a principle component analysis model of an individual and eye data for animating that model. Initially (s4-1) the image data obtained using the camera 7 is processed by the model generation module 30 of the modelling unit 28 in a conventional manner to determine a set of Eigen values representing weighting values for principle component analysis vectors for generating a three dimensional wire mesh model of the individual appearing in the image obtained using the camera 7 and texture render data for texture rendering the generated wire mesh model.

After a set of Eigen values for creating a representation of an individual appearing in the image have been stored, the model generation module 30 then (s4-2) identifies the location of the eyes of the individual appearing in the image obtained using the camera 7 of the phone 1. The location of the eyes in the image of the individual may be identified using any conventional feature recognition techniques or alternatively may be identified by a user entering data into the phone 1 via the keyboard 11.

The model generation module 30 of the modelling unit 28 then (s4-3) identifies the positioning of the pupil 100 in the eyes appearing in the image and determines for each eye the distance D between the pupil 100 and the caruncle 102 at the corner of the eye. This distance is indicative of the extent to which the sclera or white of that eye is visible in the image.

When the model generation module 30 has determined a measurement D for both of the eyes in the image, the model generation module 30 then selects for further processing the portion of the image corresponding to the eye in which the distance D between the pupil 100 and the caruncle 102 is greatest.

When the model generation module 30 has determined which of the eyes reveals the greatest extent of sclera, the model generation unit 30 then calculates eye data for animating the eye. This is achieved by initially copying the pixel data for a window of pixels extending from the pupil 100 to the edge of the caruncle 102. In this embodiment this window extends between the pupil 100 and the caruncle 102 and has a height of three pixels. The portion of the image data copied as eye data is shown highlighted in FIGS. 5 and 6.

The model generation module 30 then calculates eye data for the remainder of the eye utilising this pixel data extracted from the image. In this embodiment this is achieved by taking advantage of the rotational symmetry of the appearance of an eye ball. For each of the pixels in a texture map as illustrated in FIG. 6, other than those corresponding to the pixels copied over from the window between the pupil 100 and the caruncle 102 from the image data, the model generation module 30 determines the distance of the pixel from the pixel representing the centre of the iris. The model generation module 30 then selects from the pixels in the window in between the pupil 100 and the caruncle 102 a random pixel of the three pixels at that distance from the centre of the iris 100. This pixel is then copied over as eye data for the position of the eye. By making a selection of one of the three pixels from the window at a certain distance from the pupil 100 the basic rotational symmetry of an eye ball is modelled whilst avoiding generating eye data that has perfect rotational symmetry.

Returning to FIG. 3 after an image has been processed to determine a set of Eigen values and eye data for modelling an individual appearing in the image, the Eigen values and eye data are stored (s3-4) in the data storage section 35 of the modelling unit 28 for later retrieval.

If the processing unit 26 determines (s3-1) that a request for generating a new face model has not been entered, the processing unit 25 then (S3-5) determines whether a telephone number has been entered using the keyboard 11. If this is the case, the mobile phone then connects to the phone 1-1;1-N identified by the telephone number via the communications network 5 in a conventional manner. The mobile phone 1 then transmits (S3-6) via the communication network 5 Eigen values and eye data stored in data storage section 35 of the modelling unit 28.

The processing unit 25 then waits (s3-7) until a reply is received from the telephone being called via the communication network 5 and the transmitter/receiver 27. When a reply is received the reply will include Eigen values and eye data from the telephone being called. The processing unit 25 then passes the Eigen values and eye data and to the image generation module 32 of the modelling unit 28. The image generation module 32 processes the received data to generate (s3-8) an image of the receiver of the call which is displayed on the screen 9.

Figure 7:
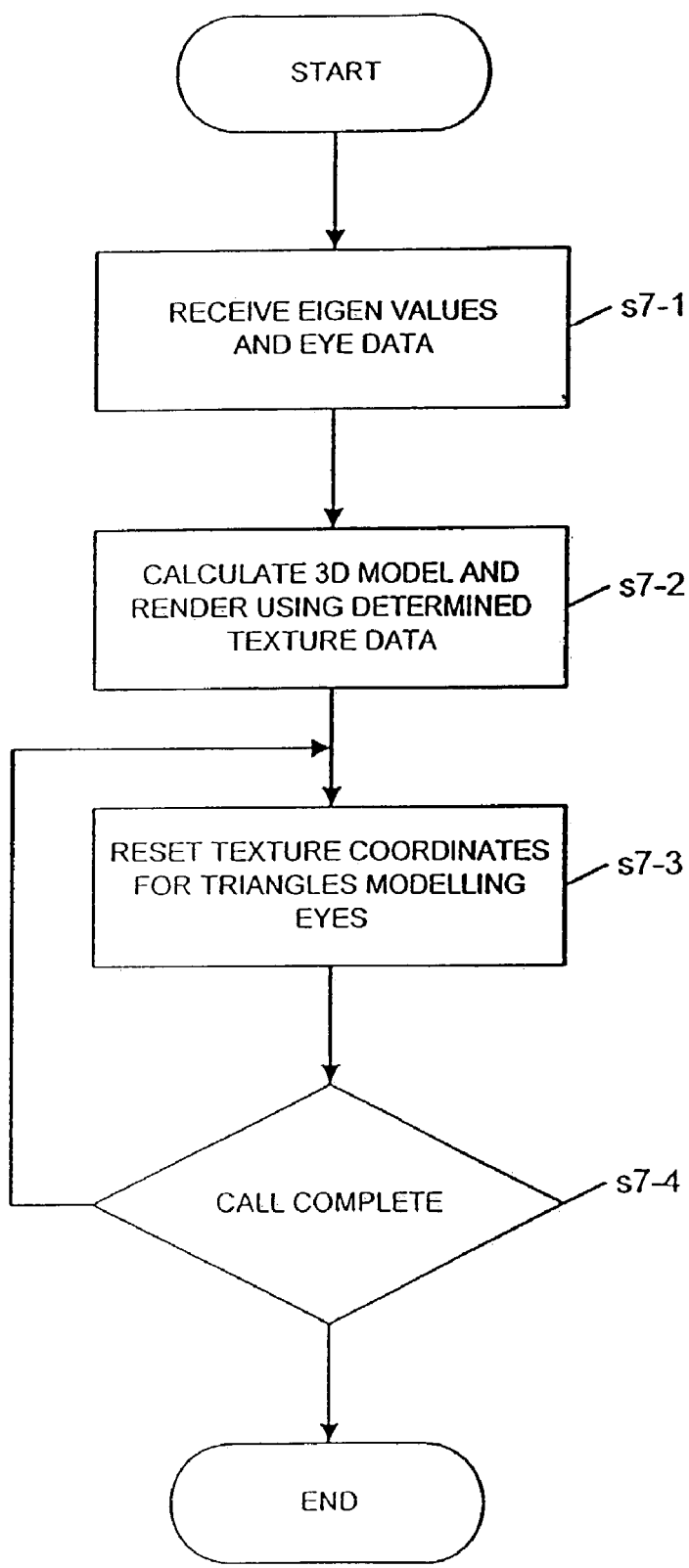
FIG. 7 is a flow diagram of the processing of data by a mobile phone of FIG. 2 to generate an animatable image of a caller.

Specifically, the image generation module 32 processes the Eigen values and eye data to generate an animated three dimensional model of the caller as will now be described in detail with reference to FIG. 7 which is a flow diagram of the processing of the image generation module 32.

Initially (s7-1) the image generation module 32 receives the Eigen value and eye data from the processing unit 25. The image generation module 32 then (s7-2) generates a wire mesh model representation of a corner and a texture map for texture rendering the generated wire mesh model utilising the Eigen values and a principle component analysis modelling system in a conventional manner. This data is then utilised to generate an image of the individual on the screen 9 of the mobile phone 1.

In order to animate the eyes of the generated image the image generation module 32 then determines which of the triangles of the generated wire mesh model are representative of the individuals eyes. From the manner in which a principle component analysis model representation of an individual is built up, these triangles will be the same triangles for all representations generated using a particular principle component analysis model.

The image generation module 32 then (s7-3) resets the texture co-ordinates for texture rendering the triangles representing the eyes in the model to identify those triangles to be texture rendered utilising the eye data received from the processing unit 25. The portion of the image representing the eyes is then re-rendered utilising the identified texture from the new texture co-ordinates.

The image generation module 32 then (S7-4) determines whether the call being made is completed. If this is not the case the texture co-ordinates for the triangles being rendered utilising the eye data are slightly amended so as to be offset from their current positions by a predetermined direction. The triangles representing the eyes in the image are then re-rendered (s7-3) utilising these new texture co-ordinates. The effect of changing the portion of the eye data utilised to texture render individual triangles representing eyes in an image gives rise to the impression that the eyes themselves are moving and therefore animates the image which is generated and displayed on the screen 9 of the phone 1.

Returning to FIG. 3, once an image of a caller has been calculated and displayed (s3-8) on the screen 9 of the phone 1, the phone 1 then proceeds (s3-9) to transmit audio data received via the microphone 14 and output received audio data received via the transmitter/receiver 27 out through the loudspeaker 13 in a conventional manner whilst continually re-rendering the texture data for representing the eyes of a displayed image to cause the eyes of the image to appear to be animated.

If the processing unit 25 determines (s3-5) that no call has been made using the keyboard 11, the processing unit 25 then determines (S3-10) whether a call has been received by the transmitter/receiver 27. If this is not the case the processing unit 25 then once again checks (s3-1) whether data indicating that a new face is to be stored has been input via the keyboard 11.

If the processing unit determines (s3-10) that a call has been received via the transmitter/receiver 27, the data received will include Eigen values and eye data. The processing unit 25 then (s3-11) stores the received image data by passing this data to the data storage section 35 of the modelling unit 28.

The processing unit 25 (s3-12) then causes the Eigen values and eye data previously generated by a user and stored within the data storage section 35 of the modelling unit 28 of the phone 1 to be dispatched via the transmitter/receiver 27 and the communications network 5 to the phone 1 from which a call has been received. The processing unit 25 then causes the image generation module 34 to generate (s3-8) and animate an image of the caller using the Eigen values and eye data received from the communications network 5 as has previously been described.

Finally after an image has been displayed, the processing unit 25 causes audio data received by the microphone 14 to be transmitted via the transmitter/receiver 27 and audio data received by the transmitter/receiver 27 to be output by the loudspeaker 13 in a conventional manner, whilst the eyes of displayed images are animated (s3-9), in the same manner as has previously been described.

Further Embodiments and Modifications

Although in the above embodiment, a system has been described in which eye data for animating a model is generated from the same image utilised to create the model, it is possible for the same animation effect to be realised utilising a pre-stored set of eye data. Such an alternative system is not a preferred embodiment of the present invention as it has been determined that the appearance in colour of individuals irises and scleras can vary significantly depending upon the lighting conditions in which an image of an individual is taken. An advantage of using the technique described with reference to the drawings is that the colour of the eye data generated using these techniques matches the rest of the model of that individual being generated.

Although the above embodiment has been described in relation to a system in which processing takes place on mobile phones and the images generated are images of callers to those mobile phones, it will be appreciated that the present invention has wider applications for animating the eyes of any computer representation of an individual generated from texture rendering a wire mesh computer representation of the an individual.

Although the embodiment or the invention described with reference to the drawings comprises computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although in the above embodiments, systems for modelling faces have been described, it will be appreciated that the present invention is more generally applicable. Specifically, the present invention may be utilised to model for example whole heads rather than only faces or alternatively larger portions of an individual (e.g. head and shoulders) or even for generating full body models.

Further, although the above embodiments have described systems in which principle component analysis models are utilised to generate representations of individuals, it will be appreciated that the present invention is applicable to other systems where models of individuals are generated. Thus for example the present invention is applicable to a system in which a 3-D model head of an individual is created by identifying the location of features of an individual in an image and associating those points with depth data for the average depth for those points on the surface on an individuals head. Representations of an individual could then be created and animated utilising eye data in the manner which has previously been described.

What is claimed is:

1. A method of generating texture render data comprising:
receiving an image, the image including a representation of an eye having a corner and a pupil;
identifying, in the received image, a portion of the image extending between the pupil and the corner of the eye represented in the image; and
utilizing the identified portion of the received image to generate texture render data, wherein the generation of texture render data comprises
copying at least some of the identified portion of the received image as texture render data, and
calculating the remainder of the texture render data utilizing the copied data, such that texture render data at a specified distance from the center of the pupil in the texture render data corresponds to image data from within the identified portion of the received image at a corresponding distance from the center of the pupil in the identified portion of the received image.

2. A method in accordance with claim 1, wherein the image includes a representation of a first and a second eye, each of the first and second eyes having a corner and a pupil, the method further comprising:
determining which eye, of the first and the second eyes, has a greater distance between the pupil and the corner of the eye; and
utilizing the identified portion of the received image extending between the pupil and the corner of the eye having the greater distance between the pupil and the corner, to generate texture render data.

3. A computer-readable data carrier storing computer executable process steps for causing a programmable computer to perform a method in accordance with claim 1.

4. A data carrier in accordance with claim 3, comprising a computer disc.

5. A data carrier in accordance with claim 4, wherein said computer disc comprises an optical, magneto-optical or magnetic disc.

6. A data carrier in accordance with claim 3, comprising an electric signal transferred via the Internet.

7. A method of generating a texture rendered model, the method comprising:
   obtaining an image of an individual to be modeled, the image including a representation of an eye having a corner and a pupil;
   identifying in the obtained image, a portion of the image extending between the pupil and the corner of the eye represented in the image;
   utilizing the identified portion of the received image to generate texture render data, wherein texture render data at a specified distance from the center of the pupil is determined by utilizing image data from within the identified portion of the received image at the specified distance from the center of the pupil;
   utilizing the obtained image data to generate a 3D computer wire mesh model; and
   texture rendering the portions of the wire mesh model representing the eyes of the wire mesh model by utilizing the generated texture render data.

8. A method in accordance with claim 7, wherein animation of the eyes of the wire mesh model is achieved by re-rendering the portions of the wire mesh model representing the eyes by utilizing different portions of the generated texture render data.

9. An apparatus for generating texture render data comprising:
   a receiver operable to receive an image including a representation of an eye having a corner and a pupil;
   an identification unit operable to identify a portion of the image received by said receiver extending between the pupil and the corner of the eye represented in the image;
   a copying unit operable to generate texture render data by copying at least some of the identified portion of the received image; and
   a calculation unit operable to calculate the remainder of the texture render data utilizing the copied data, such that texture render data at a specified distance from the center of the pupil in the texture render data corresponds to image data from within the identified portion of the received image at a corresponding distance from the center of the pupil in the identified portion of the received image.

10. An apparatus in accordance with claim 9, wherein the identification unit is operable to;
    process a received image including a representation of a first eye and a second eye, each having a corner and a pupil, to determine the identified portion of the received image extending between the pupil and the corner of the eye represented in the received image where the distance between the pupil and the corner of the eye is greatest,
    and wherein said calculation unit is operable to generate texture render data utilizing the identified portion of the received image for which the distance between the pupil and the corner of the eye is greatest.

11. An apparatus for generating a texture rendered model, the apparatus comprising:
    a receiver operable to receive an image including a representation of an eye having a corner and a pupil;
    an identification unit operable to identify a portion of the image received by said receiver extending between the pupil and the corner of the eye represented in the image;
    a copying unit operable to generate texture render data by copying at least some of the identified portion of the received image; and
    a calculation unit operable to calculate the remainder of the texture render data utilizing the copied data, such that texture render data at a specified distance from the center of the pupil in the texture render data corresponds to image data from within the identified portion of the received image at a corresponding distance from the center of the pupil in the identified portion of the received image; and
    an image generation unit operable to texture render portions of computer generated models by utilizing the texture render data.

12. An apparatus in accordance with claim 11, wherein said image generation unit comprises:
    a model generation unit operable to utilize image data received by the receiver to generate a 3D wire mesh model of an individual represented by received image data; and
    a texture rendering unit operable to texture render the wire mesh model, wherein said texture rendering unit is arranged to texture render portions of the wire mesh model representing the eyes by utilizing the texture render data.

* * * * *

UNITED STATES PATENT AND TRADEMARK OFFICE
CERTIFICATE OF CORRECTION

PATENT NO. : 7,006,102 B2
APPLICATION NO. : 10/424724
DATED : February 28, 2006
INVENTOR(S) : Simon Michael Rowe It is certified that error appears in the above-identified patent and that said Letters Patent is hereby corrected as shown below:

TITLE PAGE:
(75) Inventor: "Simon Michael Rowe, Berkshire (GB)" should read
-- Simon Michael Rowe, Bracknell (GB) --; and

(56) References Cited, U.S. PATENT DOCUMENTS,
Insert:

| | | | |
|---|---|---|---|
| -- US-6,307,954 | 10/2001 | Suzaki | 382/117 |
| US-6,252,976 | 06/2001 | Schildkraut et al. | 382/117 |
| US-6,535,223 | 03/2003 | Foley | 345/629 |
| US-6,546,121 | 04/2003 | Oda | 382/117 |
| US-2002/0012454 | 01/2002 | Liu et al. | 382/118 |
| US-2002/0102010 | 08/2002 | Liu et al. | 382/107 |
| US-6,791,584 | 09/2004 | Xie | 345/764 --. |

COLUMN 1:
Line 9, "relates" should read -- relate --; and
Lines 18 and 31, "principle" should read -- principal --.

COLUMN 2:
Line 24, "utilizes" should read -- utilize --;
Line 42, "principle" should read -- principal --;
Line 43, "models" should read -- model's --; and
Line 62, "image" should read -- image is --.

COLUMN 3:
Line 8, "principle" should read -- principal --; and
Line 60, "eye" should read -- eye- --.

COLUMN 4:
Line 38, "individuals" should read -- individual's --; and
Lines 39 and 42, "principle" should read -- principal --.

UNITED STATES PATENT AND TRADEMARK OFFICE
CERTIFICATE OF CORRECTION

PATENT NO. : 7,006,102 B2
APPLICATION NO. : 10/424724
DATED : February 28, 2006
INVENTOR(S) : Simon Michael Rowe It is certified that error appears in the above-identified patent and that said Letters Patent is hereby corrected as shown below:

<u>COLUMN 6</u>:
Line 24, "principle" should read -- principal --; and
Line 33, "viduals" should read -- vidual's --.

Signed and Sealed this

Tenth Day of April, 2007

JON W. DUDAS
*Director of the United States Patent and Trademark Office*